United States Patent
Bryson et al.

(10) Patent No.: US 10,396,272 B2
(45) Date of Patent: Aug. 27, 2019

(54) DISPLAY DISTORTION FOR ALIGNMENT WITH A USER GAZE DIRECTION

(71) Applicant: INTERNATIONAL BUSINESS MACHINES CORPORATION, Armonk, NY (US)

(72) Inventors: Donald L. Bryson, Chattanooga, TN (US); Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/586,426

(22) Filed: May 4, 2017

(65) Prior Publication Data

US 2018/0321740 A1    Nov. 8, 2018

(51) Int. Cl.
*G06F 3/01*   (2006.01)
*G06F 3/0346*   (2013.01)
(Continued)

(52) U.S. Cl.
CPC ........ *H01L 41/0926* (2013.01); *G06F 1/1652* (2013.01); *G06F 3/013* (2013.01);
(Continued)

(58) Field of Classification Search
CPC ...... G06F 1/1652; G06F 1/1684; G06F 3/013; G06F 3/0346; G06F 3/0484; G06F 21/00;
(Continued)

(56) References Cited

U.S. PATENT DOCUMENTS

| | | | | |
|---|---|---|---|---|
| 6,891,317 B2 * | 5/2005 | Pei | ......... | A61M 5/142 310/328 |
| 2004/0052037 A1 * | 3/2004 | Sawyer | ......... | G06F 1/1601 361/679.05 |

(Continued)

FOREIGN PATENT DOCUMENTS

| CN | 103645749 A | 3/2014 |
|---|---|---|
| WO | 2015168464 A1 | 11/2015 |

OTHER PUBLICATIONS

Donald L. Bryson et al., "Local Distortion of a Two Dimensional Image to Produce a Three Dimensional Effect", U.S. Appl. No. 15/586,388, filed May 4, 2017.

(Continued)

*Primary Examiner* — Michael J Eurice
(74) *Attorney, Agent, or Firm* — Cantor Colburn LLP; Tihon Poltavets (57) ABSTRACT

Systems, methods, and computer-readable media are disclosed for distorting a display coupled to a user device to bring the display into alignment with a gaze direction of a user of the user device. In certain scenarios, a user's gaze direction may not be aligned with a display of the user device. In such example scenarios, a user device determines a gaze direction of a user using, for example, camera means. When an event occurs, the user device determines one or more distortion elements to activate based at least in part on the gaze direction of the user. The user device then activates the distortion element(s) to cause the display of the device to distort to a position in which it is aligned with the gaze direction of the user. The distortion element(s) may be formed of an electroactive polymer configured to deform upon application of an electric field.

13 Claims, 6 Drawing Sheets

(51) Int. Cl.
*H01L 41/00* (2013.01)
*H01L 41/04* (2006.01)
*H01L 41/09* (2006.01)
*G06F 1/16* (2006.01)
G09G 3/20 (2006.01)
G06F 3/0484 (2013.01)
G09F 9/37 (2006.01)
G09F 9/30 (2006.01)
G06F 21/00 (2013.01)
H04N 5/64 (2006.01)
H01L 41/193 (2006.01)
H04M 1/02 (2006.01)
G06F 3/0481 (2013.01)

(52) U.S. Cl.
CPC .......... *G06F 1/1684* (2013.01); *G06F 3/0346* (2013.01); *G06F 3/0484* (2013.01); *G06F 3/04815* (2013.01); *G06F 21/00* (2013.01); G06F 2200/1637 (2013.01); G06F 2203/04803 (2013.01); *G09F 9/301* (2013.01); *G09F 9/372* (2013.01); *G09G 3/2003* (2013.01); *G09G 3/2092* (2013.01); *G09G 2320/028* (2013.01); G09G 2320/068 (2013.01); G09G 2320/0613 (2013.01); *G09G 2320/08* (2013.01); *G09G 2340/0464* (2013.01); *G09G 2354/00* (2013.01); *G09G 2360/144* (2013.01); *G09G 2380/02* (2013.01); *H01L 41/042* (2013.01); *H01L 41/193* (2013.01); *H04M 1/0268* (2013.01); *H04M 2250/52* (2013.01); *H04N 5/64* (2013.01)

(58) Field of Classification Search
CPC ... G06F 2200/1637; G06F 2203/04803; G06F 3/04803; G09F 9/301; G09F 9/372; G09G 3/2003; G09G 3/2092; G09G 2320/028; G09G 2320/0613; G09G 2320/068; G09G 2320/08; G09G 2340/0464; G09G 2354/00; G09G 2360/144; G09G 2380/02; G09G 2320/234; G09G 2320/0464; H04N 5/64; H01L 41/193; H01L 41/042; H01L 41/0926; H04M 1/0268
See application file for complete search history.

(56) References Cited

U.S. PATENT DOCUMENTS

| | | | | |
|---|---|---|---|---|
| 2004/0249510 A1* | 12/2004 | Hanson | .................. | G06N 3/008 700/245 |
| 2005/0137542 A1* | 6/2005 | Underhill | ................ | A61F 13/42 604/361 |
| 2010/0109486 A1* | 5/2010 | Polyakov | .............. | G06F 3/0202 310/365 |
| 2010/0117975 A1* | 5/2010 | Cho | ....................... | G06F 1/1626 345/173 |
| 2010/0171393 A1* | 7/2010 | Pei | ........................ | H01L 41/094 310/330 |
| 2010/0188422 A1* | 7/2010 | Shingai | .................. | G06F 3/016 345/647 |
| 2011/0134144 A1* | 6/2011 | Moriwaki | ............ | G09G 3/3208 345/660 |
| 2011/0188189 A1* | 8/2011 | Park | ....................... | G05B 11/01 361/679.05 |
| 2011/0227822 A1* | 9/2011 | Shai | ....................... | G06F 1/1615 345/156 |
| 2012/0029416 A1* | 2/2012 | Parker | ..................... | A61F 13/02 604/20 |
| 2012/0075166 A1* | 3/2012 | Marti | ...................... | G06F 3/011 345/1.1 |
| 2012/0133622 A1* | 5/2012 | Brokken | ................. | G06F 3/016 345/204 |
| 2013/0235323 A1* | 9/2013 | Sotzing | .................... | C09K 9/02 351/44 |
| 2014/0002419 A1* | 1/2014 | Thorson | .................. | G06F 3/147 345/175 |
| 2014/0098095 A1* | 4/2014 | Lee | ......................... | G06F 3/041 345/420 |
| 2014/0204509 A1* | 7/2014 | Park | .................. | G02F 1/133305 361/679.01 |
| 2014/0320396 A1* | 10/2014 | Modarres | .............. | G06F 3/0412 345/156 |
| 2014/0368440 A1* | 12/2014 | Polyakov | .............. | G06F 1/1626 345/173 |
| 2015/0002438 A1* | 1/2015 | Vartanian | ................. | G06F 3/016 345/173 |
| 2015/0034469 A1* | 2/2015 | Xue | ....................... | H01H 13/85 200/5 A |
| 2015/0185762 A1* | 7/2015 | Magi | ....................... | G06F 1/163 361/679.03 |
| 2015/0185781 A1* | 7/2015 | Yu | .......................... | G06F 1/1652 345/173 |
| 2016/0063828 A1* | 3/2016 | Moussette | ................ | G08B 6/00 340/540 |
| 2016/0091968 A1* | 3/2016 | Angelo | ..................... | G06F 3/011 345/156 |
| 2016/0179230 A1* | 6/2016 | Rider | ...................... | G06F 1/1652 345/173 |
| 2016/0187976 A1* | 6/2016 | Levesque | ................ | G06F 3/016 705/14.4 |
| 2016/0187985 A1* | 6/2016 | Lim | ......................... | G06F 3/016 345/173 |
| 2016/0190428 A1* | 6/2016 | Lim | ...................... | G06F 1/1652 310/317 |
| 2016/0274676 A1* | 9/2016 | Jung | .................... | G06F 3/04883 |
| 2016/0363959 A1* | 12/2016 | Rider | ..................... | G06F 1/1652 |
| 2017/0041568 A1* | 2/2017 | Rakshit | .................... | H04N 5/64 |
| 2017/0054970 A1* | 2/2017 | Singh | ................... | H04N 13/327 |
| 2017/0068318 A1* | 3/2017 | McClure | .................. | G06F 3/016 |
| 2017/0212607 A1* | 7/2017 | Yoon | ..................... | G06F 3/0346 |
| 2017/0213488 A1* | 7/2017 | Koo | ....................... | G09G 3/003 |
| 2017/0357420 A1* | 12/2017 | Dye | ...................... | G06F 3/0482 |

OTHER PUBLICATIONS

List of IBM Patents or Patent Applications Treated as Related; (Appendix P), Filed Jul. 13, 2017; 2 pages.

* cited by examiner

DISPLAY DISTORTION FOR ALIGNMENT WITH A USER GAZE DIRECTION

BACKGROUND

Mobile device use has become nearly ubiquitous in recent years. Many users now utilize smartphones, tablets, or the like to perform a variety of daily activities beyond simply making and receiving voice calls including, for example, browsing the Internet, composing/sending/receiving e-mails or other messages, performing e-commerce transactions, and so forth. Despite such extensive use, there are times when a user may not be actively using his mobile device. In particular, in certain scenarios, a user may place his mobile device on a surface (e.g., a desk) while the user is engaged in other activities (e.g., working on another computing system). In such scenarios, while the display of the device may still be within the user's view, the display may not be aligned with the user's gaze direction even if the user shifts his gaze direction toward the device, thereby making it difficult for the user to view content being displayed on the display.

SUMMARY

In one or more example embodiments of the invention, a method for distorting a display coupled to a user device is disclosed. The method includes identifying an event and determining a gaze direction of a user of the user device. The method further includes determining one or more distortion elements to activate based at least in part on the gaze direction of the user and activating the one or more distortion elements to cause the display to distort and align with the gaze direction of the user.

In one or more other example embodiments of the invention, a device is disclosed. The device includes at least one memory storing computer-executable instructions and at least one processor configured to access the at least one memory and execute the computer-executable instructions to perform a set of operations. The operations include identifying an event and determining a gaze direction of a user of the device. The operations further include determining one or more distortion elements to activate based at least in part on the gaze direction of the user and activating the one or more distortion elements to cause a display coupled to the device to distort and align with the gaze direction of the user.

In one or more other example embodiments of the invention, a computer program product for distorting a display coupled to a user device is disclosed that includes a storage medium readable by a processing circuit, the storage medium storing instructions executable by the processing circuit to cause a method to be performed. The method includes identifying an event and determining a gaze direction of a user of the user device. The method further includes determining one or more distortion elements to activate based at least in part on the gaze direction of the user and activating the one or more distortion elements to cause the display to distort and align with the gaze direction of the user.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the invention include, among other things, systems, methods, computer-readable media, techniques, and methodologies for distorting a display of a user device to bring the display into alignment with a gaze direction of a user. In certain scenarios, a user's gaze direction may not be aligned with a display of the user device such as, for example, if the device is laying on a flat surface and the user's gaze direction is not directly overhead the device. In example embodiments of the invention, such as the above-described scenario, a user device determines a gaze direction of a user using, for example, camera means. When an event occurs, the user device selects one or more distortion elements to activate based at least in part on the gaze direction of the user. The user device then activates the distortion element(s) to cause the display of the device to distort to a position in which it is aligned with the gaze direction of the user.

In certain example embodiments, the event may be a device-based event such as an incoming call or message, a meeting reminder, or the like, while in other example embodiments, the event may be a change in the gaze direction towards the device. In certain example embodiments, the distortion element(s) may be formed of an electroactive polymer (EAP) material. Portions of the EAP material (e.g., EAP strips) may be disposed on a back side of the display, or otherwise positioned in physical and/or electrical contact with the display, such that activation of the EAP portions causes the portions to deform, thereby causing corresponding portions of the display in contact with the activated portions to distort. Activating a distortion element such as an EAP strip may include generating and applying an electric field to the strip that causes the strip to deform. In certain example embodiments of the invention, the EAP strips may be arranged in multiple layers such that strips forming part of different layers may be positioned orthogonally and/or non-orthogonally with respect to one another.

Figure 1A:
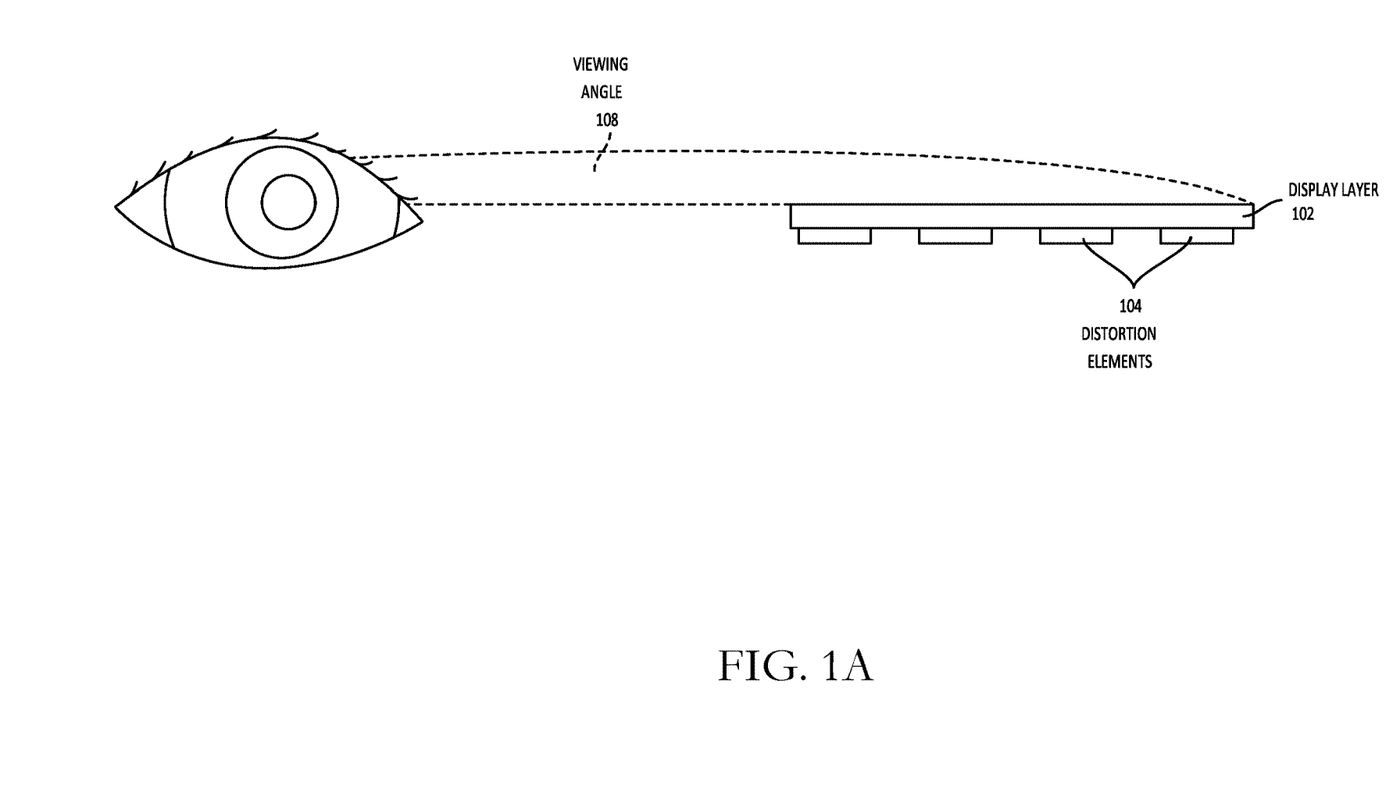
FIG. 1A is a schematic diagram illustrating a scenario in which a display of a user device is not aligned with a gaze direction of a user in accordance with one or more example embodiments of the invention.

FIG. 1A is a schematic diagram illustrating a first scenario in which a display of a user device is not aligned with a gaze direction of a user. FIG. 1A depicts a partial cross-section of an example user device. The user device includes a display layer 102 and a plurality of distortion elements 104 disposed in physical and/or electrical contact with the display layer 102. The user device may be a smartphone, a tablet, a personal digital assistant, a personal computer, an electronic reader, or any other suitable electronic device capable of displaying digital content. The display layer 102 may be a liquid-crystal display (LCD), a light-emitting diode (LED) display, an organic electroluminescent (OLED) display, or the like. The distortion elements 104 may be formed of a material that is capable of deformation such as, for example, when an electric field or a magnetic field is applied to the material. While example embodiments of the invention will be described hereinafter in reference to an example user device (e.g., a mobile device) and its display layer 102, it should be appreciated that the display layer may be part of (e.g., internally coupled) or externally coupled to other devices/systems. For example, the display layer may be a computer monitor display, a television display, a patient monitor display (e.g., for patients with limited head/neck motion), a display designed for handicapped individuals, or the like. Example embodiments of the invention are also applicable to avionics display applications that may benefit from adjustments to the display based on the pilot's line-of-sight.

In certain example embodiments, the distortion elements 104 may be formed of an EAP material that deforms under application of an electric field. The distortion elements 104 may be arranged in strips of the EAP material and disposed in physical and/or electrical contact with a back surface of the display layer 102. The EAP material may be a ferroelectric material, a liquid crystal polymer (LCP) material, a polyvinylidene fluoride material, or any other material whose force-voltage performance and power consumption rate make it suitable for use with mobile devices for example.

In certain example embodiments, the EAP strips may be arranged in multiple layers such that strips forming part of different layers may be arranged orthogonally and/or non-orthogonally with respect to one another. For example, a first group of EAP strips in a first layer may be arranged orthogonally with respect to a second group of EAP strips in a second layer. In certain example embodiments, one or more EAP strips in a first layer may be arranged non-orthogonally (e.g., at an angle other than 90 degrees) with respect to one or more EAP strips in a second layer. Further, in certain example embodiments, some EAP strips in a first layer may be arranged orthogonally with respect to some EAP strips in a second layer, while other EAP strips in the first layer may be arranged non-orthogonally with respect to other EAP strips in the second layer. In certain example embodiments, different layers of EAP strips may be electrically isolated from one another.

Orthogonal and/or non-orthogonal arrangement of EAP strips of different layers as described above allows for the display layer 102 to bow and twist in response to activation of the EAP strips, thereby accommodating complex facing angles. In addition, in certain example embodiments, one or more mechanical systems such as stops, elastomers, springs, or the like may be positioned in tension with one or more EAP strips to mitigate—when an electric field is applied to the EAP strips—the departure of the resultant curvature of the display layer 102 from linearity. The greater the linearity of the curvature of the display layer 102, the larger the viewing area with lesser distortion.

As previously noted, FIG. 1A depicts a scenario in which the display layer 102 is not aligned with a gaze direction of a user. In particular, in the scenario depicted in FIG. 1A, even if a user's gaze direction is in the general direction of the user device, the lack of alignment creates a narrow viewing angle 108 that makes content displayed on the display layer 102 difficult to discern. More specifically, in the scenario of FIG. 1A, none of the distortion elements 104 are activated, and thus, the display layer 102 is not distorted, and the narrow viewing angle 108 between the user's gaze direction and the display layer 102 reduces visibility of content being displayed on the display layer 102.

Figure 1B:
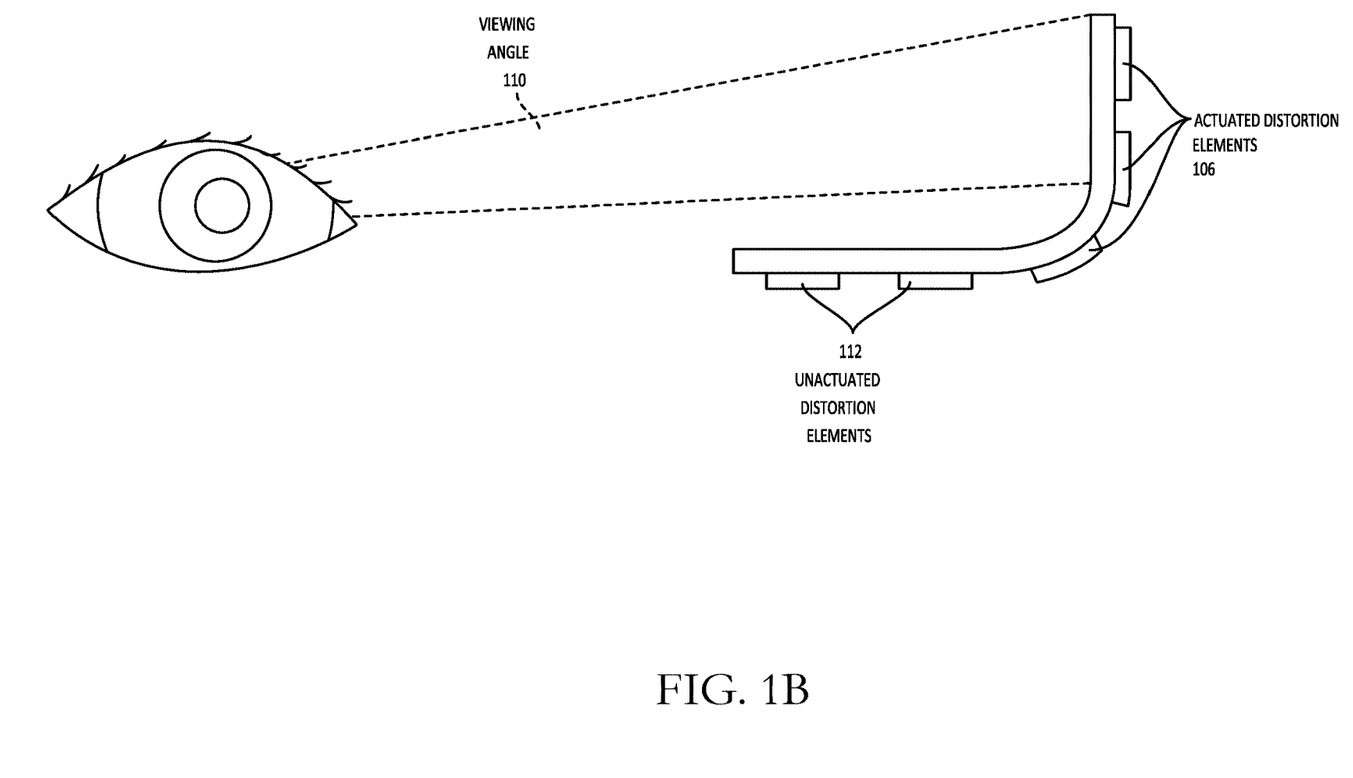
FIG. 1B is a schematic diagram illustrating a scenario in which a display of a user device is aligned with a gaze direction of a user as a result of activation of one or more distortion elements in accordance with one or more example embodiments of the invention.

FIG. 1B is a schematic diagram illustrating a scenario in which the display layer 102 of the user device is distorted and brought into alignment with a gaze direction of a user as a result of activation of one or more of the distortion elements 104. In particular, one or more activation signals may be generated to cause one or more of the distortion elements 104 to become activated and deform, thereby resulting in distortion of the display layer 102 due to the activated distortion elements 106 being in physical and/or electrical contact with the display layer 102. In certain example embodiments, such as those in which the distortion elements 104 are EAP strips, the activation signal(s) may cause an electric field generating component of the user device to generate and apply an electric field to one or more distortion elements 106. In response to application of the electric field, the distortion element(s) 106 may deform, thereby resulting in distortion of the display layer 102. As a result, the distorted portion of the display layer 102 may become aligned with a gaze direction of the user, producing a larger viewing angle 110 that enables the user to easily view content displayed on the display layer 102. Activation of the distortion element(s) 106 may include generating and sending the activation signal(s) and/or generating and applying an electric field to the distortion element(s) to cause them to deform.

It should be appreciated that one or more of the distortion elements 104 may not be activated (e.g., distortion element(s) 112) so that only a portion of the display layer 102 is distorted. For example, only a subset of the distortion elements 104 may be activated so that only a portion of the display layer 102 displaying relevant content is distorted, while other portions of the display layer 102 remain undistorted to provide stability for the user device.

As previously described, the distortion elements 104 (e.g., EAP strips) may be arranged in orthogonal and/or non-orthogonal directions in multiple electrically isolated layers to enable convex distortions, concave distortions, or complex distortions that simultaneously include both convex and concave distortions (e.g., bowing and twisting of the display layer 102). As such, multiple complex viewing angles can be accommodated such as those in which the gaze direction of the user is not co-linear with the user device. As will be described in more detail in reference to FIGS. 2 and 3, the distortion element(s) 106 may be activated to cause distortion of the display layer 102 in response to occurrence of an event that satisfies one or more criteria for display distortion and alignment.

Figure 2:
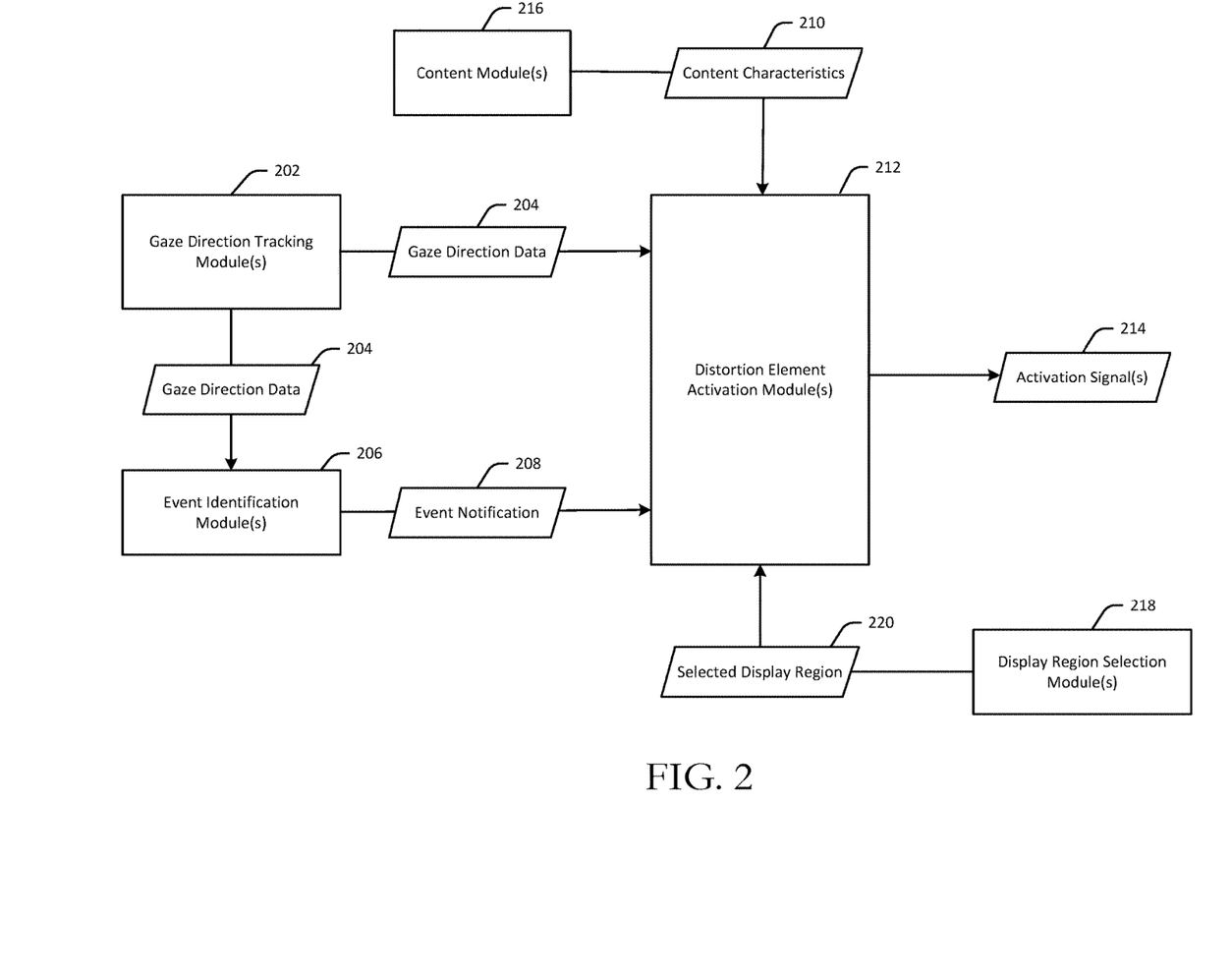
FIG. 2 is a schematic diagram depicting illustrative components for activating distortion element(s) to cause a display of a user device to distort and become aligned with a gaze direction of a user in accordance with one or more example embodiments of the invention.
Figure 3:
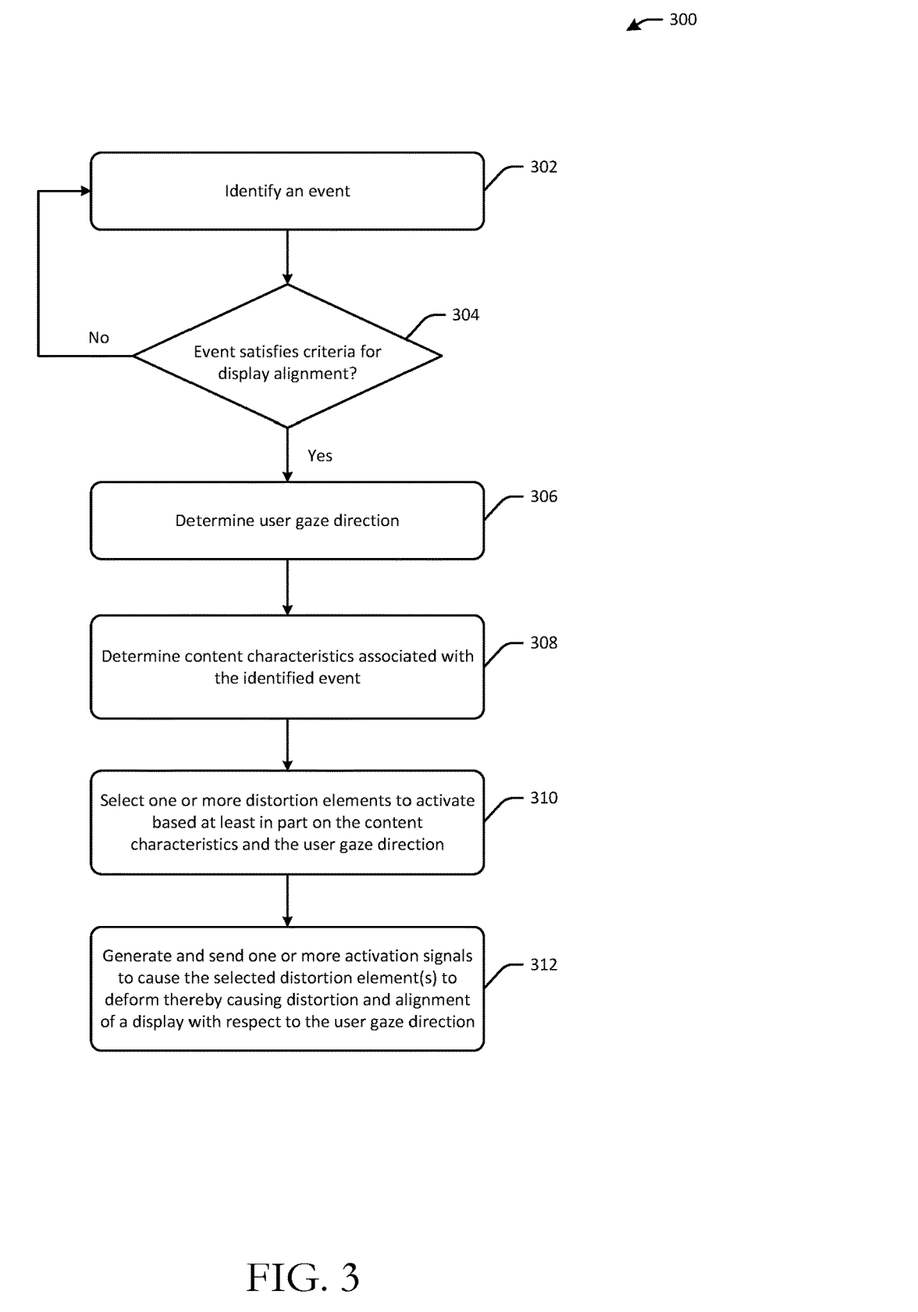
FIG. 3 is a process flow diagram of an illustrative method for activating distortion element(s) to cause a display of a user device to distort and become aligned with a gaze direction of a user in accordance with one or more example embodiments of the invention.
Figure 4:
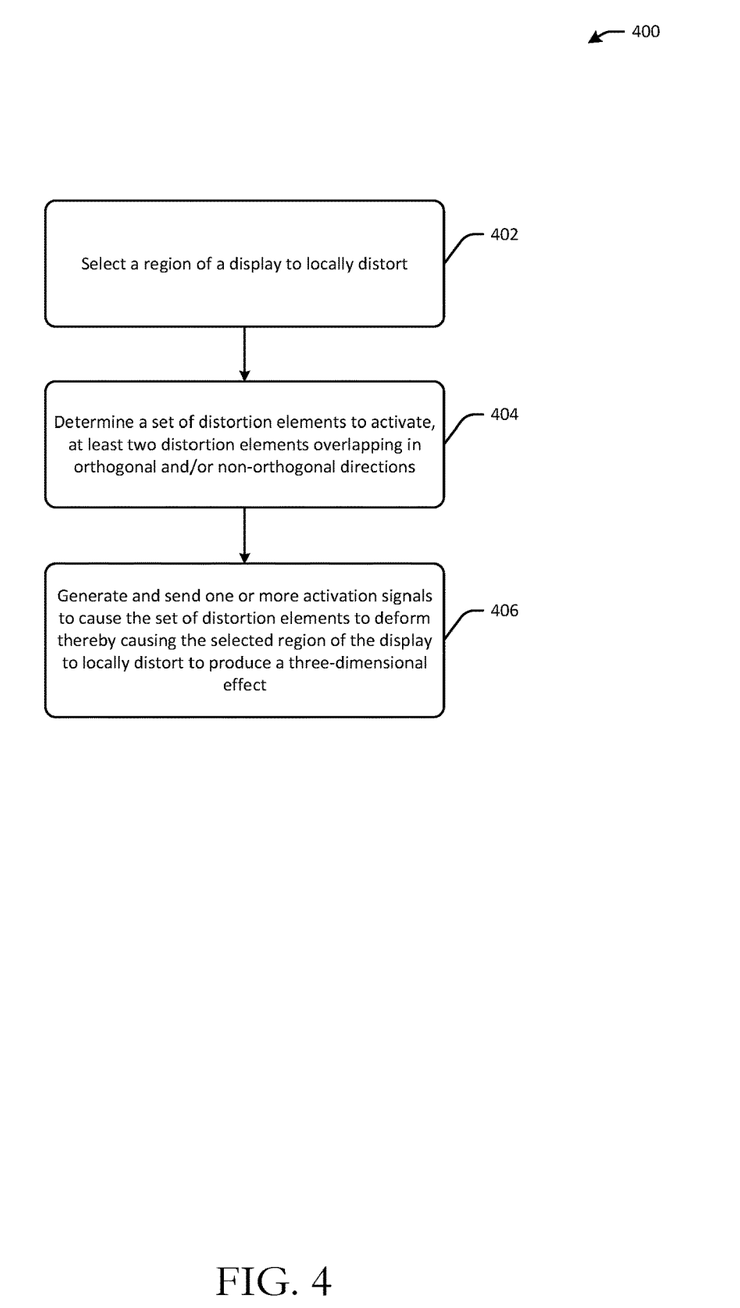
FIG. 4 is a process flow diagram of an illustrative method for generating a perceptible three dimensional (3D) effect from a two dimensional image in accordance with one or more example embodiments of the invention.

FIG. 2 is a schematic diagram depicting illustrative components for activating distortion element(s) to cause a display of a user device to distort and become aligned with a gaze direction of a user. FIG. 3 is a process flow diagram of an illustrative method 300 for activating distortion element(s) to cause a display of a user device to distort and become aligned with a gaze direction of a user. FIG. 4 is a process flow diagram of an illustrative method 400 for generating a perceptible three dimensional (3D) effect from a two dimensional image. FIGS. 3 and 4 will each be described individually hereinafter in conjunction with FIG. 2.

Each operation of either of the methods 300 or 400 may be performed by one or more components that may be implemented in any combination of hardware, software, and/or firmware. In certain example embodiments, one or more of these component(s) may be implemented, at least in part, as software and/or firmware that contains or is a collection of one or more program modules that include computer-executable instructions that when executed by a processing circuit cause one or more operations to be performed. A system or device described herein as being configured to implement example embodiments of the invention may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring first to FIGS. 2 and 3 in conjunction with one another, at block 302 of the method 300, computer-executable instructions of one or more event identification modules 206 may be executed to identify an event. In certain example embodiments, the event may be a device-based event such as an incoming voice mail, an incoming message, a meeting reminder, or similar device-based notification. In other example embodiments, the event may be a change in the gaze direction of a user towards a user device such as a change in the gaze direction of a user to within a range of potential gaze directions indicative of the user gazing at or in the vicinity of the user device.

At block 304 of the method 300, computer-executable instructions of the event identification module(s) 206 may be executed to determine whether the event satisfies one or more criteria for initiating a distortion and alignment of a display of the user device. If the criteria are determined to be satisfied, the event identification module(s) 206 may generate an event notification 208 indicative of the event. In certain example embodiments, the criteria may relate to the type of event. For example, only events designated as "high priority" events may satisfy the criteria. The priorities of various events may be default priorities set by the user device or may be established by user preferences. For instance, a user may indicate a preference that calls or messages from certain contacts be designated as high priority events. As another non-limiting example, a user may indicate that meeting reminders, notifications from selected mobile applications, or the like are high priority events. Further, in certain example embodiments, a user may establish preferences relating to the time of day an event occurs. For example, a user may indicate that no events, regardless of their priority, should initiate display distortion and alignment if they occur during a particular time period (e.g., 12 AM to 7 AM). Alternatively, the user may specify that only high priority events should initiate display distortion and alignment during such a time period.

In certain example embodiments, the event identified at block 302 of the method 300 may be related to the user. For example, the event may be a change in the gaze direction of the user towards the user device. The event identification module(s) 206 may determine that the gaze direction of the user has changed based on gaze direction data 204 received from one or more gaze direction tracking modules 202. The criteria evaluated at block 304 of the method 300 may then be whether the gaze direction has changed to so that it now falls within a range of gaze directions that are indicative of a likelihood that the user is looking at the user device or at a location proximate to the user device. In other words, the user device may not initiate display distortion and alignment unless the user's gaze direction is in the general vicinity of the user device.

Further, in certain example embodiments, the criteria evaluated at block 304 of the method 300 may relate to both the type of device-based event that occurs as well as the current gaze direction of the user. For example, in certain example embodiments, a positive determination may be made at block 304 of the method 300 if the event is identified at block 302 is designated as a high-priority event and the user's gaze direction is within a predetermined range of gaze directions within a period of time since the event occurred. It should be appreciated that the above-described examples of events that can be identified at block 302 and the criteria that may be evaluated at block 304 are merely illustrative and not exhaustive.

In response to a negative determination at block 304, the method 300 may return to block 302 for identification of a new event when such an event occurs. On the other hand, in response to a positive determination at block 304, the method 300 may proceed to block 306, where computer-executable instructions of the gaze direction tracking module(s) 202 may be executed to determine a gaze direction of the user. In particular, the gaze direction tracking module(s) 202 may utilize input from one or more cameras of the user device configured to track the user's gaze direction to generate the gaze direction data 204. In certain example embodiments, many users may be present within the detectable range of the camera(s) of the user device, in which case, one of the multiple users may be selected as a primary user based on a primary user definition. The gaze direction of the primary user may be determined and the subsequent distortion and alignment of the display may be with respect to this primary user.

It should be appreciated that, in certain example embodiments, the gaze direction tracking module(s) 202 may determine the gaze direction of the user and generate the gaze direction data 204 indicative thereof prior to evaluation of the criteria at block 304 of the method 300. For example, if the criteria evaluated at block 304 relates to whether the user's gaze direction has changed and now falls within a predetermined range of gaze directions indicating that the user is looking at or near the user device, the event identification module(s) 206 may need to receive the gaze direction data 204 as input prior to evaluating the criteria. It should further be appreciated that, in certain example embodiments, the event identified at block 302 may not be evaluated against any criteria, and rather, distortion and alignment of the display with the gaze direction of the user may be automatically and programmatically initiated based on occurrence of the event.

At block 308 of the method 300, computer-executable instructions of one or more content modules 216 may be executed to determine one or more characteristics of content displayed on a display of the user device. The content module(s) 216 may generate content characteristics data 210 indicative of the one or more content characteristics. The content characteristics may include, for example, a volume of content being displayed (e.g., a number of characters), a font type of the content, a font size of the content, attributes associated with graphics that are displayed (e.g., the pixel dimensions of an image), and so forth. In certain example embodiments, the content characteristics data 210 may relate to content associated with the identified event. For example, the content characteristics data 210 may indicate a volume of content associated with an incoming short message service (SMS) message, email, instant message, or the like.

At block 310 of the method 300, computer-executable instructions of one or more distortion element activation modules 212 may be executed to determine one or more distortion elements to activate. The distortion element activation module(s) 212 may receive the gaze direction data 204 and the content characteristics data 210 as input, and the determination at block 310 of the method 300 may be based at least in part on one or more of these inputs. For example, in certain example embodiments, the distortion element activation module(s) 212 may select only a subset of available distortion elements (e.g., a subset of the EAP strips) to activate in order to ensure that the display is deformed only to the extent necessary to make the relevant content visible to the user without jeopardizing the stability of the user device. For instance, the greater the volume of content to be made visible to the user, the greater the number of distortion element(s) that may be selected for activation, and thus, the greater the display distortion that may result. In particular, the distortion element activation module(s) 212 may not activate one or more of the distortion elements in order to mitigate the extent of distortion of the display in order to maintain the stability of the distorted portion of the display if, for example, the device is seated on a surface.

At block 312 of the method 300, computer-executable instructions of the distortion element activation module(s) 212 may be executed to generate and send one or more activation signals 214 to cause the selected distortion element(s) to deform, thereby causing distortion and alignment of the display of the user device with respect to the user gaze direction. More specifically, in those example embodiments in which the distortion elements are EAP strips, the distortion element activation module(s) 212 may generate and send the activation signal(s) 214 to an electric field generating component of the user device. The activation signal(s) 214 may identify which distortion element(s) have been selected for activation. In response to receipt of the activation signal(s), the electric field generating component may generate and apply an electric field to the selected EAP strips to cause their deformation. Because the EAP strips are in physical and/or electrical contact with the display of the user device, their deformation may, in turn, cause the display to distort and become aligned with the user gaze direction.

FIG. 4 is a process flow diagram that depicts an illustrative method 400 for generating a perceptible three dimensional (3D) effect from a two dimensional image. Referring to FIGS. 2 and 4 in conjunction with one another, at block 402 of the method 400, computer-executable instructions of one or more display region selection modules 218 may be executed to select a region 220 of a display to locally distort. The display may be flat or curved. The region 220 of the display may be selected based on user input or automatically by the user device. For example, a user may provide touch input or the like indicative of the selected region 220. Alternatively, the user device may automatically select the region 220 based on device parameters and/or user preferences. For example, the user device may select the region 220 based on the image being displayed in the region 220 as compared to images displayed in other regions of the display. An indication of the selected region 220 of the display may be provided as input to the distortion element activation module(s) 212.

At block 404 of the method 400, computer-executable instructions of the distortion element activation module(s) 212 may be executed to determine a set of one or more distortion elements to activate based at least in part in the selected region 220 of the display. For example, the distortion element activation module(s) 212 may select for activation those distortion elements that correspond to the selected region 220 (e.g., are in physical and/or electrical contact with the selected region 220). In certain example embodiments, a first set of the selected distortion elements may form part of a first layer and a second set of selected distortion elements may form part of a second layer such that the first set of selected distortion elements overlaps with the second set of selected distortion elements in orthogonal and/or non-orthogonal directions.

At block 406 of the method 400, computer-executable instructions of the distortion element activation module(s) 212 may be executed to generate and send one or more activation signals to cause the selected distortion element(s) to deform and thereby cause the corresponding selected region 220 of the display to distort to produce a 3D effect from the 2D image being displayed in the selected region 220. In certain example embodiments, such as those in which the distortion elements are EAP strips, the distortion element activation module(s) 212 may send the activation signal(s) to an electric field generating component of the user device. Upon receipt of the activation signal(s), the electric field generating component may generate and apply an electric field to the selected EAP strips to cause them to deform, thereby distorting the selected region 220 of the display and producing the 3D effect. The distortion of the selected region 220 of the display may include concave, convex, and/or complex distortions. In an example scenario, distortion of the display may cause a character displayed in the selected region 220 to appear to be in a different plane than a background image, thereby producing the 3D effect. In certain example embodiments, the user device may change the distortion elements selected for activation to dynamically adjust the type of display distortion that occurs as the 2D image displayed in the selected region 220 changes.

In certain example embodiments, multiple regions of the display may be selected and respective sets of one or more distortion elements corresponding to the multiple regions may be activated to cause the multiple regions of the display to locally distort. In certain example embodiments, electric fields of varying magnitudes may be applied to distortion elements corresponding to different regions of the display to cause varying amounts of deformation of the distortion elements, and thus, varying amounts of distortion of the different regions.

For example, in addition to a first region of the display, a second region of the display may also be selected and one or more distortion elements corresponding to the second region of the display may be determined and activated to cause the second region of the display to locally distort as well. Activating a first one or more distortion elements corresponding to the first region of the display may include applying a first electric field having a first magnitude to the first one or more distortion elements. Similarly, activating a second one or more distortion elements corresponding to the second region of the display may include applying a second electric field having a second magnitude to the second one or more distortion elements. The first magnitude may be greater than the second magnitude thereby causing a greater amount of distortion of the first region than the second region. Activating distortion elements corresponding to different regions of a display using electric fields of varying magnitudes (or other activation mechanisms) may produce a varied 3D effect for different portions of a 2D image being displayed on the display. For example, a first portion of the 2D image (e.g., the nose of a human face) may be made to appear more pronounced than a second portion of the 2D image (e.g., the eyes of the human face) by applying an electric field having a larger magnitude to the distortion element(s) corresponding to the display region displaying the first portion of the 2D image than to the distortion element(s) corresponding to the display region displaying the second portion of the 2D image.

In addition, in certain example embodiments, distortion elements corresponding to different regions of the display may be activated at different times to produce an animation effect. For example, as described earlier, first and second regions of a display may be selected, and a respective set of distortion element(s) corresponding to each region may be activated to cause each display region to locally distort. In certain example embodiments, a first one or more distortion elements corresponding to the first display region may be activated during a first time period and a second one or more distortion elements corresponding to the second display region may be activated during a second time period. At least a portion of the second time period may be subsequent to the first time period. There may be some overlap between the first time period and the second time period or the second time period may occur entirely subsequent to the first time period. Activating distortion elements corresponding to different display regions during at least partially non-overlapping time periods can produce a dynamic 3D effect that varies with time and can be used to generate a 3D animated effect such as the contraction of a muscle in 3D or the movement of an object through space over time.

Example embodiments of the invention provide various technical features, technical effects, and/or improvements to technology. For instance, example embodiments of the invention provide the technical effect of aligning a display to a gaze direction of a user to permit the user to view content displayed on the display. This technical effect is achieved at least in part by the technical features of coupling distortion elements to the display and programmatically selecting one or more of the distortion elements to activate to cause the display to distort and thereby align with the gaze direction of the user. Distortion of the display may occur as a result of the technical feature of forming the distortion elements from a material that deforms in the presence of an electric or magnetic field.

The above-described technical features and their corresponding technical effect yield an improvement to display technology by providing the capability to deform a display to have it automatically align with the gaze direction of a user without requiring the user to position the display (e.g., pick up the device) in a plane that intersects his gaze direction vector or alter the location of his gaze direction vector (e.g., move his head) so that it intersects the plane in which the display lies. The above-described technical features and their corresponding technical effect also improve the functioning of a computer by providing an improved user device capable of distorting its display and making displayed content visible to a user without requiring the user to change the plane of the display or his gaze direction vector.

Figure 5:
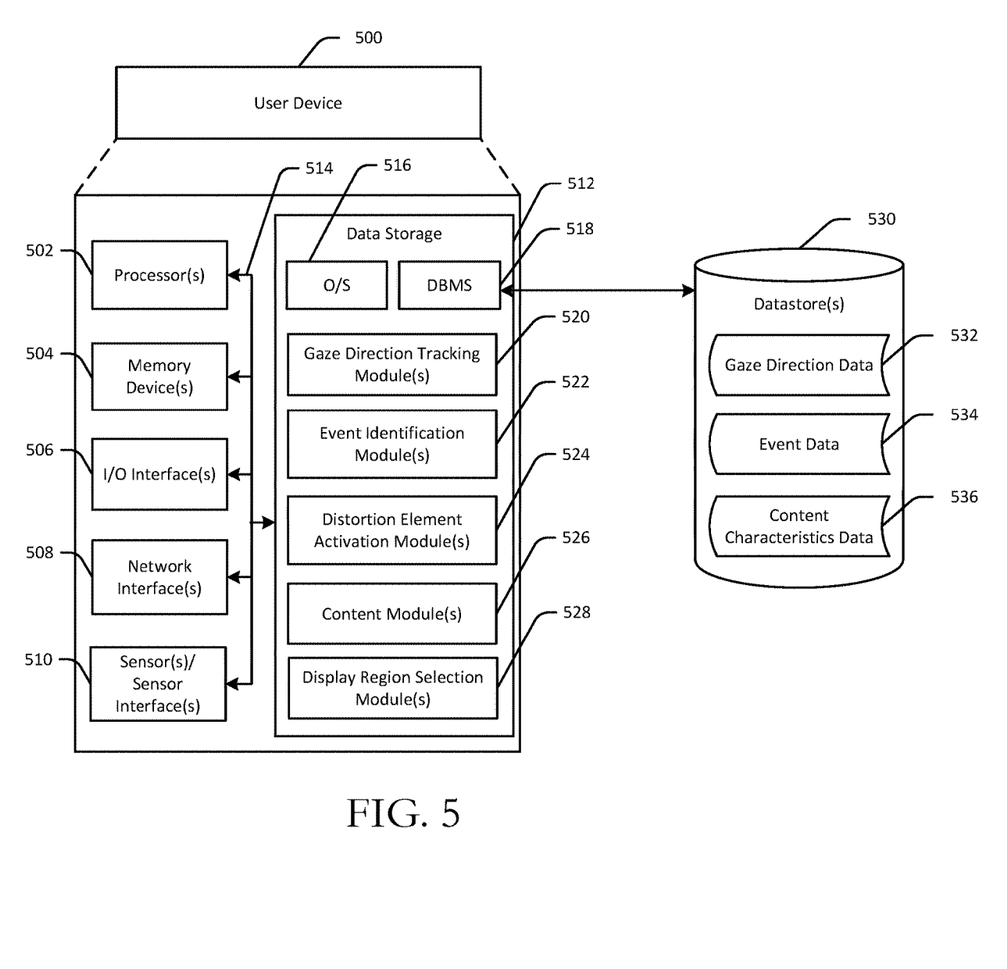
FIG. 5 is a schematic diagram of an illustrative configuration of a user device in accordance with one or more example embodiments of the invention.

FIG. 5 is a schematic diagram of an illustrative computing device 500 configured to implement one or more example embodiments of the invention. The illustrative computing device 500 may be an illustrative configuration of a user device having the display layer 102 and the distortion elements 104 depicted in FIGS. 1A-1B.

In an illustrative configuration, the user device 500 may include one or more processors 502, one or more memory devices 504 (generically referred to herein as memory 504), one or more input/output ("I/O") interface(s) 506, one or more network interfaces 508, one or more sensors/sensor interfaces 510, and data storage 512. The user device 500 may further include one or more buses 514 that functionally couple various components of the device 500.

The bus(es) 514 may include at least one of a system bus, a memory bus, an address bus, or a message bus, and may permit the exchange of information (e.g., data (including computer-executable code), signaling, etc.) between various components of the user device 500. The bus(es) 514 may include, without limitation, a memory bus or a memory controller, a peripheral bus, an accelerated graphics port, and so forth. The bus(es) 514 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 512 may include removable storage and/or non-removable storage including, but not limited to, magnetic storage, optical disk storage, and/or tape storage. The data storage 512 may provide non-volatile storage of computer-executable instructions and other data. The memory 504 and the data storage 512, removable and/or non-removable, are examples of computer-readable storage media (CRSM) as that term is used herein.

The data storage 512 may store computer-executable code, instructions, or the like that may be loadable into the memory 504 and executable by the processor(s) 502 to cause the processor(s) 502 to perform or initiate various operations. The data storage 512 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504 and may ultimately be copied to data storage 512 for non-volatile storage.

More specifically, the data storage 512 may store one or more operating systems (O/S) 516; one or more database management systems (DBMS) 518 configured to access the memory 504 and/or one or more external data store(s) 530; and one or more program modules, applications, engines, computer-executable code, scripts, or the like such as, for example, one or more gaze direction tracking modules 520, one or more event identification modules 522, one or more distortion element activation modules 524, one or more content modules 526, and one or more display region selection modules 528. Any of the components depicted as being stored in data storage 512 may include any combination of software, firmware, and/or hardware. The software and/or firmware may include computer-executable instructions (e.g., computer-executable program code) that may be loaded into the memory 504 for execution by one or more of the processor(s) 502 to perform any of the operations described earlier in connection with similarly named program modules depicted in FIG. 2. While the user device 500 is illustratively shown as containing program modules configured to implement any of the example embodiments described herein, it should be appreciated that some program modules may not be present in certain example embodiments.

Although not depicted in FIG. 5, the data storage 512 may further store various types of data utilized by components of the user device 500 (e.g., any of the data depicted as being stored in the data store(s) 530). Any data stored in the data storage 512 may be loaded into the memory 504 for use by the processor(s) 502 in executing computer-executable instructions. In addition, any data stored in the data storage 512 may potentially be stored in the external data store(s) 530 and may be accessed via the DBMS 518 and loaded in the memory 504 for use by the processor(s) 502 in executing computer-executable instructions.

The processor(s) 502 may be configured to access the memory 504 and execute computer-executable instructions loaded therein. For example, the processor(s) 502 may be configured to execute computer-executable instructions of the various program modules, applications, engines, or the like of the user device 500 to cause or facilitate various operations to be performed in accordance with one or more embodiments of the invention. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to other illustrative components depicted as being stored in the data storage 512, the O/S 516 may be loaded from the data storage 512 into the memory 504 and may provide an interface between other application software executing on the user device 500 and hardware resources of the user device 500. More specifically, the O/S 516 may include a set of computer-executable instructions for managing hardware resources of the user device 500 and for providing common services to other application programs. In certain example embodiments, the O/S 516 may include or otherwise control execution of one or more of the program modules depicted as being stored in the data storage 512. The O/S 516 may include any operating system now known or which may be developed in the future including, but not limited to, any server operating system, any mainframe operating system, or any other proprietary or non-proprietary operating system.

The DBMS 518 may be loaded into the memory 504 and may support functionality for accessing, retrieving, storing, and/or manipulating data stored in the memory 504, data stored in the data storage 512, and/or data stored in the external data store(s) 530. The DBMS 518 may use any of a variety of database models (e.g., relational model, object model, etc.) and may support any of a variety of query languages. The DBMS 518 may access data represented in one or more data schemas and stored in any suitable data repository. The external data store(s) 530 that may be accessible by the user device 500 via the DBMS 518 may include, but are not limited to, databases (e.g., relational, object-oriented, etc.), file systems, flat files, distributed data stores in which data is stored on more than one node of a computer network, peer-to-peer network data stores, or the like. In certain example embodiments, the DBMS 518 may be a lightweight DBMS designed for a mobile device. The data store(s) 530 may store gaze direction data 532 indicative of user gaze directions tracked over some period of time, event data 534 indicative of identified events, and content characteristics data 536 indicative of characteristics associated with content displayed on the device, potentially in relation to an identified event.

Referring now to other illustrative components of the user device 500, the input/output (I/O) interface(s) 506 may facilitate the receipt of input information by the user device 500 from one or more I/O devices as well as the output of information from the user device 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the user device 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more antennas to connect to one or more of the network(s) 506 via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The user device 500 may further include one or more network interfaces 508 via which the user device 500 may communicate with any of a variety of other systems, platforms, networks, devices, and so forth. The network interface(s) 508 may enable communication, for example, with one or more other devices or system via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The user device 500 may further include one or more sensors/sensor interfaces 510. The sensor(s)/sensor interface(s) 510 may include any suitable sensor or sensor interface such as, for example, an accelerometer, a gyroscope, other types of inertial sensors, a camera, or the like.

It should be appreciated that the program modules depicted in FIG. 5 as being stored in the data storage 512 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the user device 500 and/or hosted on other device(s) accessible via one or more networks, may be provided to support functionality provided by the modules depicted in FIG. 5 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of devices 502 in accordance with any suitable computing model such as, for example, a client-server model, a peer-to-peer model, and so forth. In addition, any of the functionality described as being supported by any of the modules depicted in FIG. 5 may be implemented, at least partially, in hardware and/or firmware across any number of devices.

It should further be appreciated that the user device 500 may include alternate and/or additional hardware, software, or firmware components beyond those described or depicted without departing from the scope of the invention. More particularly, it should be appreciated that software, firmware, or hardware components depicted as forming part of the user device 500 are merely illustrative and that some components may not be present or additional components may be provided in various embodiments. While various illustrative modules have been depicted and described as software modules stored in data storage 512, it should be appreciated that functionality described as being supported by such modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 300 or 400 may be performed by a user device 500 having the illustrative configuration depicted in FIG. 5, or more specifically, by one or more program modules, engines, applications, or the like executing on such a system or device. It should be appreciated, however, that such operations may be implemented in connection with numerous other device configurations.

The operations described and depicted in the illustrative methods of FIGS. 3 and 4 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIGS. 3 and 4 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of embodiments of the invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

Example embodiments of the invention may be a system, a method, and/or a computer program product. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of example embodiments of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for distorting a display coupled to a user device, the method comprising:
   identifying a device-based event;
   determining that the device-based event satisfies one or more criteria for distorting the display;
   determining a gaze direction of a user of the user device;
   determining distortion elements to activate based at least in part on the gaze direction of the user; and
   activating the distortion elements to cause the display to distort and align with the gaze direction of the user, wherein activating the distortion elements comprises causing an electric field to be applied to a plurality of electroactive polymer (EAP) portions disposed in a plurality of layers, wherein application of the electric field causes the plurality of EAP portions to deform, wherein the plurality of EAP portions comprises at least two EAP portions that are disposed in different layers and that overlap non-orthogonally, and wherein the different layers are electrically isolated from one another.

2. The computer-implemented method of claim 1, further comprising determining one or more characteristics of content displayed on the display, wherein determining the distortion elements comprises determining the distortion elements further based at least in part on the one or more characteristics of the content.

3. The computer-implemented method of claim 1, wherein the distortion elements are a first collection of distortion elements, the method further comprising:
   identifying a change in the gaze direction of the user;
   determining a second collection of one or more distortion elements to activate based at least in part on the change in the gaze direction of the user; and
   activating the second collection of one or more distortion elements to cause the display to distort and align with the changed gaze direction of the user.

4. The computer-implemented method of claim 1, wherein the device-based event is an incoming message or call.

5. The computer-implemented method of claim 1, wherein determining that the device-based event satisfies the one or more criteria for distorting the display comprises determining that the gaze direction of the user is within a predetermined range of potential gaze directions within a predetermined period of time from occurrence of the device-based event.

6. The computer-implemented method of claim 5, further comprising determining that the gaze direction of the user is not within the predetermined range of gaze directions at the occurrence of the device-based event.

7. A device, comprising:
   at least one memory storing computer-executable instructions; and
   at least one processor configured to access the at least one memory and execute the computer-executable instructions to:
      identify a device-based event;
      determine that the device-based event satisfies one or more criteria for distorting the display;
      determine a gaze direction of a user of the device;
      determine distortion elements to activate based at least in part on the gaze direction of the user; and
      activate the distortion elements to cause a display coupled to the device to distort and align with the gaze direction of the user, wherein the at one processor is configured to activate the distortion elements by executing the computer-executable instructions to cause an electric fields to be applied to a plurality of electroactive polymer (EAP) portions disposed in a plurality of layers, wherein application of the electric field causes the plurality of EAP portions to deform, wherein the plurality of EAP portions comprised at least two EAP portions that are disposed in different layers and that overlap non-orthogonally, and wherein the different layers are electrically isolated from one another.

8. The device of claim 7, wherein the distortion elements are a first collection of distortion elements, and wherein the at least one processor is further configured to execute the computer-executable instructions to:
   idenitfy a change in the gaze direction of the user;
   determine a second collection of one or more distortion elements to activate based at least in part on the change in the gaze direction of the user; and
   activate the second collection of one or more distortion elements to cause the display to distort and align with the changed gaze direction of the user.

9. The device of claim 7, wherein the at least one processor is further configured to execute the computer-executable instructions to determine one or more characteristics of content displayed on the display, and wherein the at least one processor executes the computer-executable instructions to determine the distortion elements further based at least in part on the one or more content characteristics.

10. The device of claim 9, wherein the at least one processor is configured to determine that the device-based event satisfies the one or more criteria for distorting the display by executing the computer-executable instructions to determine that the gaze direction of the user is within a predetermined range of potential gaze directions within a predetermined period of time from occurrence of the device-based event.

11. A computer program product for distorting a display coupled to a user device, the computer program product comprising a storage medium readable by a processing circuit, the storage medium storing instructions executable by the processing circuit to cause a method to be performed, the method comprising:
   identifying a device-based event;
   determining that the device-based event satisfies one or more criteria for distorting the display;
   determining a gaze direction of a user of the user device;
   determining distortion elements to activate based at least in part on the gaze direction of the user; and
   activating the distortion elements to cause the display to distort and align with the gaze direction of the user, wherein the activating the distortion elements comprises causing an electric field to be applied to a plurality of electroactive polymer (EAP) portions disposed in a plurality of layers, wherein application of the electric field causes the plurality of EAP portions to deform, wherein the plurality of EAP portions comprises at least two EAP portions that are disposed in different layers and that overlap non-orthogonally, and wherein the different layers are electrically isolated from one another.

12. The computer program product of claim 11, the method further comprising determining one or more characteristics of content displayed on the display, wherein determining the distortion elements comprises determining the distortion elements further based at least in part on the one or more characteristics of the content.

13. The computer program product of claim 12, wherein determining that the device-based event satisfies the one or more criteria for distorting the display comprises determining that the gaze direction of the user is within a predetermined range of potential gaze directions within a predetermined period of time from occurrence of the device-based event.

\* \* \* \* \*